United States Patent
Martinez Franco et al.

(10) Patent No.: US 11,148,953 B2
(45) Date of Patent: Oct. 19, 2021

(54) METHOD FOR SYNTHESIZING A COMPOSITE MATERIAL CONSISTING OF A MIXTURE OF AFX- AND BEA-STRUCTURE ZEOLITES IN THE PRESENCE OF AN ORGANIC NITROGEN-CONTAINING STRUCTURING AGENT

(71) Applicant: IFP Energies nouvelles, Rueil-Malmaison (FR)

(72) Inventors: Raquel Martinez Franco, Rueil-Malmaison (FR); Bogdan Harbuzaru, Rueil-Malmaison (FR)

(73) Assignee: IFP Energies nouvelles, Rueil-Malmson (FR)

( * ) Notice: Subject to any disclaimer, the term of this patent is extended or adjusted under 35 U.S.C. 154(b) by 0 days.

(21) Appl. No.: 17/058,004

(22) PCT Filed: May 16, 2019

(86) PCT No.: PCT/EP2019/062564
§ 371 (c)(1),
(2) Date: Nov. 23, 2020

(87) PCT Pub. No.: WO2019/224091
PCT Pub. Date: Nov. 28, 2019

(65) Prior Publication Data
US 2021/0198113 A1 Jul. 1, 2021

(30) Foreign Application Priority Data

May 24, 2018 (FR) .................................... 18/54.385

(51) Int. Cl.
*C01B 39/48* (2006.01)
*B01J 29/80* (2006.01)
(Continued)

(52) U.S. Cl.
CPC ......... *C01B 39/023* (2013.01); *B01J 29/7007* (2013.01); *B01J 29/80* (2013.01);
(Continued)

(58) Field of Classification Search
None
See application file for complete search history.

(56) References Cited

U.S. PATENT DOCUMENTS

| 4,508,837 A | 4/1985 | Zones |
| 5,194,235 A | 3/1993 | Zones |
(Continued)

FOREIGN PATENT DOCUMENTS

| JP | 2016169139 A | 9/2016 |
| WO | 2016/077667 A1 | 5/2016 |
(Continued)

OTHER PUBLICATIONS

Boruntea et al, "Crystallization of AEI and AFX zeolite through zeolite to zeolite transformations", Microporous and Mesoporous Materials 278 (2019) 105-114, available online Nov. 2, 2018 (Year: 2018).*

International Search Report for PCT/EP2019/062564, dated Aug. 1, 2019; English translation submitted herewith (6 pgs.).
(Continued)

Primary Examiner — David M Brunsman
(74) Attorney, Agent, or Firm — Fitch, Even, Tabin & Flannery, LLP (57) ABSTRACT

The present invention relates to a process for preparing a zeolite composite material composed of a mixture of AFX and BEA zeolites, comprising at least the following steps:
i) mixing in aqueous medium, in particular proportions, of an FAU zeolite having an $SiO_2/Al_2O_3$ mole ratio of between 30 and 100 and a parameter $P_{ze}$ such that: $3250<P_{ze}<7200$, with at least one zeolite of FAU structure type having an $SiO_2/Al_2O_3$ mole ratio of between 2 and 30 (upper limit excluded), of at least one organonitrogen compound R, R being (Continued)

1,5-bis(methylpiperidinium)pentane dihydroxide, 1,6-bis(methylpiperidinium)hexane dihydroxide and/or 1,7-bis(methylpiperidinium)heptane dihydroxide, of at least one source of at least one alkali metal and/or alkaline-earth metal M of valency n, to obtain a gel, ii) hydrothermal treatment of said gel obtained at a temperature of between 120° C. and 220° C., for a time of between 12 hours and 15 days.

20 Claims, 2 Drawing Sheets

(51) Int. Cl.
  *C01B 39/02* (2006.01)
  *B01J 29/70* (2006.01)
(52) U.S. Cl.
  CPC ............ *C01B 39/48* (2013.01); *C01B 39/026* (2013.01); *C01P 2002/72* (2013.01)

(56) References Cited

U.S. PATENT DOCUMENTS

| | | | |
|---|---|---|---|
| 9,908,108 B2* | 3/2018 | Davis | B01J 37/04 |
| 2018/0093259 A1 | 4/2018 | Chen et al. | |
| 2018/0093897 A1* | 4/2018 | Chen | C01B 39/026 |

FOREIGN PATENT DOCUMENTS

| | | |
|---|---|---|
| WO | 2016/205509 A1 | 12/2016 |
| WO | 2017/087385 A1 | 5/2017 |
| WO | 2017/200607 A1 | 11/2017 |
| WO | 2017/202495 A1 | 11/2017 |

OTHER PUBLICATIONS

Martin Nuria et al. "Cage-based small-pore catalysts for NH3-SCR prepared by combining bulky organic structure directing agents with modified zeolites as reagents" Applied Catalysis B: Environmental, Elsevier, Amsterdam, NL, vol. 217, May 29, 2017 (May 29, 2017), pp. 125-136 DOI: 10.1016/J.APCATB.2017.05.082 ISSN: 0926-3373, XP085112832.

* cited by examiner

METHOD FOR SYNTHESIZING A COMPOSITE MATERIAL CONSISTING OF A MIXTURE OF AFX- AND BEA-STRUCTURE ZEOLITES IN THE PRESENCE OF AN ORGANIC NITROGEN-CONTAINING STRUCTURING AGENT

CROSS-REFERENCE TO RELATED APPLICATIONS

This application is a U.S. national phase application filed under 35 U.S.C. § 371 of International Application No. PCT/EP2019/062564, filed May 16, 2019, designating the United States, which claims priority from French Patent Application No. 18/54.385, filed May 24, 2018, which are hereby incorporated herein by reference in their entirety.

TECHNICAL FIELD

The present invention relates to a process for the direct preparation of a composite material containing an intimate mixture of a zeolite of AFX structure type and of a zeolite of BEA structure type. This process makes it possible to perform the direct synthesis of an AFX-BEA zeolite composite material, by conversion/transformation under hydrothermal conditions of a particular assembly of at least two zeolites of FAU structure type, used as a source of silicon and of aluminum, in the presence of a specific organic molecule including two quaternary ammonium functions, also referred to as a structuring agent, chosen from 1,5-bis (methylpiperidinium)pentane, 1,6-bis(methylpiperidinium) hexane and 1,7-bis(methylpiperidinium)heptane, in the dihydroxide form thereof. The present invention also relates to the zeolite composite material itself. Said zeolite composite material, containing a mixture of zeolites of AFX structure type and of BEA structure type, obtained according to the process of the invention advantageously finds its application as a catalyst, adsorbent or separating agent.

PRIOR ART

Crystalline microporous materials, such as zeolites or silicoaluminophosphates, are solids that are extensively used in the petroleum industry as catalysts, catalytic supports, adsorbents or separating agents. Although many microporous crystalline structures have been discovered, the refining and petrochemical industry is constantly in search of novel zeolitic structures which have particular properties for applications such as the purification or separation of gases, the conversion of carbon-based species or the like.

Zeolites of AFX structure type in particular comprise the zeolite SSZ-16 and the related solids, known as zeotypes, SAPO-56 and MEAPSO-56. A zeolite of AFX structure type has a three-dimensional system of pores delimited by eight tetrahedra and is formed by two types of cages: gmelinite (GME cage) and a large AFT cage (~8.3×13.0 Å).

Numerous methods for synthesizing zeolites of AFX structure type, and in particular the zeolite SSZ-16, are known. The zeolite SSZ-16 was synthesized, for example, using organonitrogen species derived from lower 1,4-bis(1-azoniabicyclo[2.2.2]octane) alkane compounds (U.S. Pat. No. 4,508,837). Chevron Research and Technology Company prepared the zeolite SSZ-16 in the presence of DABCO-$C_n$-diquat cations, where DABCO represents 1,4-diazabicyclo[2.2.2]octane and n is 3, 4 or 5 (U.S. Pat. No. 5,194,235). S. B. Hong et al. used the diquaternary alkylammonium ion Et6-diquat-n, in which Et6-diquat represents N',N'-bis-triethylpentanediammonium and n is 5, as a structuring agent for the synthesis of the zeolite SSZ-16 (Micropor. Mesopor. Mat., 60 (2003) 237-249). Mention may also be made of the use of 1,3-bis(adamantyl)imidazolium cations as a structuring agent for preparing zeolites of AFX structure type (R. H. Archer et al. in Micropor. Mesopor. Mat., 130 (2010) 255-2265; Johnson Matthey Company WO 2016/077667A1). Inagaki Satoshi et al., in patent application JP 2016169139 used divalent cations N,N,N',N'-tetra-arquirubicyclo[2.2.2]oct-7-ene-2,3:05,6-dipyrrolidium substituted with alkyl groups to prepare the zeolite SSZ-16. Chevron U.S.A. (WO 2017/200607 A1) proposes to perform the synthesis of a zeolite SSZ-16 using the dications: 1,1'-(1,4-cyclohexylenedimethylene)bis[1-methylpiperidinium], 1,1'-(1,4-cyclohexylenedimethylene)bis[1-methylpyrrolidinium], 1,1'-(1,4-cyclohexylene dimethylene)bis[1-ethylpyrrolidinium]. H.-Y. Chen et al. (Johnson Matthey Company, US 2018/0093897) used a mixture of cations containing at least 1,3-bis(adamantyl)imidazolium and a neutral amine to prepare the zeolite JMZ-10 of AFX structure type in the absence of alkali metal cations. H.-Y. Chen et al. (Johnson Matthey Company, US2018/0093259) used a mixture of cations containing an organic molecule chosen from 1,3-bis(adamantyl)imidazolium, N,N-dimethyl-3,5-dimethylpiperidinium, N,N-diethyl-cis-2,6-dimethylpiperidinium, N,N,N-1-trimethyladamantylammonium, N,N,N-dimethylethylcyclohexylammonium and at least one alkaline-earth metal cation to obtain the zeolite JMZ-7 of AFX structure type which bears close Al sites relative to a synthesis containing alkali metal cations.

The subject of the present invention is a process for preparing a zeolite composite material composed of a mixture of zeolites of AFX structure type and of BEA structure type. The value of the invention lies in the very nature of the composite material obtained, composed of two different zeolites, of AFX structure type and of BEA structure type, which are intimately mixed. The value of the present invention also lies in the high proportion (advantageously greater than or equal to 90% by mass) of the AFX-BEA mixture in said composite material obtained. The use of such a material may then be envisaged in various applications, for example as catalyst, adsorbent or separating agent.

SUMMARY OF THE INVENTION

The present invention relates to a process for preparing a zeolite composite material composed of a mixture of zeolites of AFX structure type and of BEA structure type, comprising at least the following steps:

i) mixing, in aqueous medium, of an FAU zeolite having an $SiO_2/Al_2O_3$ mole ratio of between 30 and 100 with at least one zeolite of FAU structure type having an $SiO_2/Al_2O_3$ mole ratio of between 2 and 30 (upper limit excluded), and in which the mathematical parameter, $P_{ze}$, corresponding to the mass percentage of the FAU zeolite with an $SiO_2/Al_2O_3$ mole ratio of between 30 and 100, in its anhydrous form (expressed in %) in the mixture of FAU zeolites, multiplied by the $SiO_2/Al_2O_3$ mole ratio of said same FAU zeolite with an $SiO_2/Al_2O_3$ mole ratio of between 30 and 100, is such that: $3250 < P_{ze} < 7200$, of at least one organonitrogen compound R, chosen from 1,5-bis(methylpiperidinium)pentane dihydroxide, 1,6-bis(methylpiperidinium)hexane dihydroxide, 1,7-bis(methylpiperidinium) heptane dihydroxide and mixtures thereof, and of at least one source of at least one alkali metal and/or alkaline-earth metal M of valency n, n being an integer greater than or equal to 1, the reaction mixture having the following molar composition:

| | |
|---|---|
| $(SiO_{2\,(FAU)})/(Al_2O_{3\,(FAU)})$ | of between 30 and 80, |
| $H_2O/(SiO_{2\,(FAU)})$ | of between 1 and 100, |
| $R/(SiO_{2\,(FAU)})$ | of between 0.01 and 0.6, |
| $M_{2/n}O/(SiO_{2\,(FAU)})$ | of between 0.005 and 0.45, | in which $SiO_{2(FAU)}$ is the molar amount of $SiO_2$ provided by all the zeolites of FAU structure type introduced into the mixture, $Al_2O_{3(FAU)}$ is the molar amount of $Al_2O_3$ introduced by all the zeolites of FAU structure type introduced into the mixture, $H_2O$ the molar amount of water present in the reaction mixture, R the molar amount of said organonitrogen compound, $M_{2/n}O$ being the molar amount of $M_{2/n}O$ provided by all the FAU zeolites and by the source of alkali metal and/or alkaline-earth metal, up to the production of a homogeneous precursor gel;

ii) hydrothermal treatment of said precursor gel obtained from step i) at a temperature of between 120° C. and 220° C., for a time of between 12 hours and 15 days.

The present invention also relates to a zeolite composite material composed of a mixture of zeolites of AFX structure type and of BEA structure type, said composite material comprising:

between 30% and 90% by mass, preferably between 40% and 90% by mass of zeolite of AFX structure type, relative to the total mass of said composite material in its anhydrous form;

between 10% and 70% by mass of BEA structure type, preferably between 10% and 60% by mass of zeolite of BEA structure type, relative to the total mass of said composite material in its anhydrous form.

One advantage of the present invention lies in the particular material prepared, this material consisting of a composite material containing an intimate mixture of a zeolite of AFX structure type and of a zeolite of BEA structure type.

Another advantage of the invention consists in performing the direct synthesis of said AFX-BEA composite material. The process according to the invention in fact consists in preparing said particular zeolite composite material by direct conversion/transformation (i.e. in a single reaction step), under hydrothermal conditions, of a mixture of at least two zeolites of FAU structure type, in the presence of a specific organonitrogen compound, also referred to as a structuring agent or organic structuring agent, chosen from 1,5-bis(methylpiperidinium)pentane dihydroxide, 1,6-bis(methylpiperidinium)hexane dihydroxide and 1,7-bis(methylpiperidinium)heptane dihydroxide.

In particular, the Applicant has discovered that the organonitrogen compound or structuring agent chosen from 1,5-bis(methylpiperidinium)pentane, 1,6-bis(methylpiperidinium)hexane and 1,7-bis(methylpiperidinium)heptane in the dihydroxide form thereof, mixed with at least two zeolites of FAU structure type, as a source of silicon and of aluminum, while respecting the conditions such that one of the FAU zeolites has an $SiO_2/Al_2O_3$ mole ratio of between 30 and 100, the other zeolites(s) of FAU structure type having an $SiO_2/Al_2O_3$ mole ratio of between 2 and 30, and such that the mathematical product $P_{ze}$, between the mass percentage of the FAU zeolite with an $SiO_2/Al_2O_3$ mole ratio of between 30 and 100, in its anhydrous form (expressed in %) in the starting FAU zeolite mixture and its $SiO_2/Al_2O_3$ mole ratio, is strictly greater than 3250 and strictly less than 7200, preferably $3350<P_{ze}<7100$, leads to the production of a precursor gel of an AFX-BEA composite material having a mole ratio of the total amount of $SiO_2$ to the total amount of $Al_2O_3$ of between 30 and 80, and then to the production of an AFX-BEA composite material. Advantageously, the process according to the invention makes it possible to obtain an AFX-BEA composite material having a high proportion, advantageously greater than or equal to 90% by mass, preferably greater than or equal to 95%, preferentially greater than or equal to 98% and even more preferably greater than or equal to 99.8%, of AFX and BEA zeolites, or even free of impurities and/or of crystalline or amorphous phases other than those of the AFX and BEA zeolites.

Another advantage of the present invention is that it allows for the preparation of a precursor gel of an AFX-BEA composite material having an $SiO_2/Al_2O_3$ mole ratio which is between the $SiO_2/Al_2O_3$ mole ratios of the two starting zeolites of FAU structure type. The preparation process according to the invention thus makes it possible to adjust the $SiO_2/Al_2O_3$ ratio of the precursor gel as a function of the total supply of $SiO_2$ and of $Al_2O_3$ present in the two zeolites of FAU structure type in the reaction mixture.

DETAILED DESCRIPTION OF THE INVENTION

According to the invention, the terms "composite material", "zeolite composite material" and "AFX-BEA composite material" are synonyms and are used equivalently to denote a solid material having a zeolite structure composed of a mixture of zeolites of AFX structure type and of BEA structure type, comprising:

between 30% and 90% by mass, preferably between 40% and 90% by mass, of zeolite of AFX structure type, relative to the total mass of said composite material in its anhydrous form;

between 10% and 70% by mass, preferably between 10% and 60% by mass, of zeolite of BEA structure type, relative to the total mass of said composite material in its anhydrous form.

The AFX-BEA composite material according to the invention preferably has an (AFX/BEA) mass ratio of the zeolite of AFX structure type relative to the zeolite of BEA structure type of between 0.4 and 9, preferentially between 0.5 and 7.5 and even more preferentially between 1 and 4.

Advantageously, the composite material according to the invention has an $SiO_2/Al_2O_3$ mole ratio of between 2 and 100, preferably between 4 and 90 and more preferentially between 6 and 80.

In the present invention, the zeolite of BEA structure type of the composite material according to the invention is preferably a beta zeolite containing a mixture containing between 35% and 45% by mass, preferably 40% by mass, of polymorph A and between 55% and 65% by mass, preferably 60% by mass, of polymorph B.

Advantageously, said composite material defined previously may be obtained via the preparation process according to the invention.

In accordance with the invention, a parameter $P_{ze}$ is defined for the FAU zeolites having an $SiO_2/Al_2O_3$ mole ratio of between 30 and 100 present in the starting mixture of FAU zeolites, as the mathematical product between the percentage by mass of the FAU zeolite with an $SiO_2/Al_2O_3$ mole ratio of between 30 and 100, in its anhydrous form (expressed in %) in the starting mixture of FAU zeolites, and its $SiO_2/Al_2O_3$ mole ratio, the sum of the percentages by mass of each of the FAU zeolites in the anhydrous form in the starting mixture being equal to 100. For example, when starting with a mixture of two FAU zeolites, said parameter $P_{ze}$ for the zeolite having an $SiO_2/Al_2O_3$ mole ratio of between 30 and 100 corresponds to the percentage (expressed in %) of said FAU zeolite having an $SiO_2/Al_2O_3$ mole ratio of between 30 and 100 in its anhydrous form in the starting mixture of FAU zeolites multiplied by the $SiO_2/Al_2O_3$ mole ratio of said FAU zeolite having an $SiO_2/Al_2O_3$ mole ratio of between 30 and 100.

According to the invention, the terms "gel" and "precursor gel" are synonyms and correspond to the homogeneous reaction mixture obtained at the end of step i) of the process according to the invention.

According to the present invention, the expression "between . . . and . . . " means that the values at the limits of the interval are included in the range of values which is described. Should this not be the case and should the values at the limits not be included in the range described, such a clarification will be given by the present invention.

The present invention relates more precisely to a process for preparing a zeolite composite material composed of a mixture of zeolites of AFX structure type and of BEA structure type, comprising at least, in particular consisting of, the following steps:

i) mixing, in aqueous medium, of an FAU zeolite having an $SiO_2/Al_2O_3$ mole ratio of between 30 and 100 with at least one zeolite of FAU structure type having an $SiO_2/Al_2O_3$ mole ratio of between 2 and 30 (upper limit excluded), and in which the mathematical parameter, $P_{ze}$, corresponding to the mass percentage of the FAU zeolite with an $SiO_2/Al_2O_3$ mole ratio of between 30 and 100, in its anhydrous form (expressed in %) in the mixture of FAU zeolites, multiplied by the $SiO_2/Al_2O_3$ mole ratio of said same FAU zeolite with an $SiO_2/Al_2O_3$ mole ratio of between 30 and 100, is such that: $3250<P_{ze}<7200$, preferably $3350<P_{ze}<7100$, of at least one organonitrogen compound R, chosen from 1,5-bis(methylpiperidinium)pentane dihydroxide, 1,6-bis(methylpiperidinium)hexane dihydroxide, 1,7-bis(methylpiperidinium)heptane dihydroxide and mixtures thereof, and of at least one source of at least one alkali metal and/or alkaline-earth metal M of valency n, n being an integer greater than or equal to 1, the reaction mixture having the following molar composition:

| | |
|---|---|
| $(SiO_2{}_{(FAU)})/(Al_2O_3{}_{(FAU)})$ | between 30 and 80, preferably between 32 and 70 |
| $H_2O/(SiO_2{}_{(FAU)})$ | between 1 and 100, preferably between 5 and 60 |
| $R/(SiO_2{}_{(FAU)})$ | between 0.01 and 0.6, preferably between 0.05 and 0.5 |
| $M_{2/n}O/(SiO_2{}_{(FAU)})$ | between 0.005 and 0.45, preferably between 0.01 and 0.25 | in which $SiO_{2(FAU)}$ is the molar amount of $SiO_2$ provided by all the zeolites of FAU structure type introduced into the mixture, $Al_2O_{3(FAU)}$ is the molar amount of $Al_2O_3$ introduced by all the zeolites of FAU structure type introduced into the mixture, $H_2O$ the molar amount of water present in the reaction mixture, R the molar amount of said organonitrogen compound, $M_{2/n}O$ being the molar amount of $M_{2/n}O$ provided by all the FAU zeolites and by the source of alkali metal and/or alkaline-earth metal, step i) being performed for a time enabling the production of a precursor gel;

ii) hydrothermal treatment of said precursor gel obtained from step i) at a temperature of between 120° C. and 220° C., for a time of between 12 hours and 15 days.

Advantageously, the targeted zeolite composite material, composed of a mixture of AFX and BEA zeolites, is formed during the hydrothermal treatment step ii) of the process according to the invention.

Mixing Step i)

Step i) involves the mixing, in aqueous medium, an FAU zeolite having an $SiO_2/Al_2O_3$ mole ratio of between 30 and 100, with at least one zeolite of FAU structure type having an $SiO_2/Al_2O_3$ mole ratio of between 2 and 30 (upper limit excluded), and in which $3250<P_{ze}<7200$, preferably $3350<P_{ze}<7100$, of at least one organonitrogen compound R chosen from 1,5-bis(methylpiperidinium)pentane dihydroxide, 1,6-bis(methylpiperidinium)hexane dihydroxide, 1,7-bis(methylpiperidinium)heptane dihydroxide and mixtures thereof, and at least one source of at least an alkali metal and/or alkaline-earth metal M of valency n, n being to an integer greater than or equal to 1, the reaction mixture having the following molar composition:

| | |
|---|---|
| $(SiO_2{}_{(FAU)})/(Al_2O_3{}_{(FAU)})$ | between 30 and 80, preferably between 32 and 70 |
| $H_2O/(SiO_2{}_{(FAU)})$ | between 1 and 100, preferably between 5 and 60 |
| $R/(SiO_2{}_{(FAU)})$ | between 0.01 and 0.6, preferably between 0.05 and 0.5 |
| $M_{2/n}O/(SiO_2{}_{(FAU)})$ | between 0.005 and 0.45, preferably between 0.01 and 0.25 | in which $SiO_{2(FAU)}$ is the molar amount of $SiO_2$ provided by all the zeolites of FAU structure type introduced into the mixture, $Al_2O_{3(FAU)}$ is the molar amount of $Al_2O_3$ introduced by all the zeolites of FAU structure type introduced into the mixture, $H_2O$ the molar amount of water present in the reaction mixture, R the molar amount of said organonitrogen compound, $M_{2/n}O$ being the molar amount of $M_{2/n}O$ provided by all the FAU zeolites and by the source of alkali metal and/or alkaline-earth metal.

Step i) makes it possible to obtain a homogeneous precursor gel.

In accordance with the invention, an FAU zeolite having an $SiO_2/Al_2O_3$ mole ratio of between 30 (lower limit included) and 100 (upper limit included) and at least one zeolite of FAU structure type having an $SiO_2/Al_2O_3$ mole ratio of between 2 (lower limit included) and 30 (upper limit excluded) are incorporated into the reaction mixture for the implementation of step (i) as sources of silicon and aluminum element. The $SiO_2/Al_2O_3$ mole ratios of the FAU zeolites incorporated into the reaction mixture in step i) of the process according to the invention are advantageously different than each other. Advantageously, the overall mole ratio of the silicon element, expressed in oxide form $SiO_2$, provided by all the starting FAU zeolites, relative to the aluminum element, expressed in oxide form $Al_2O_3$, provided by all the starting FAU zeolites is between 30 and 80, preferably between 32 and 70.

In accordance with the invention, the zeolites of FAU structure type used in the reaction mixture in step i) of the process according to the invention have different $SiO_2/Al_2O_3$ mole ratios and are such that: $3250<P_{ze}<7200$, preferably $3350<P_{ze}<7100$.

Thus, depending on the starting FAU zeolites, the $SiO_2/Al_2O_3$ mole ratios of which are different, and on their relative amounts, the $SiO_2/Al_2O_3$ mole ratio of the precursor gel of the targeted AFX-BEA composite material can be adjusted.

The starting zeolites of FAU structure type, that with an $SiO_2/Al_2O_3$ mole ratio of between 30 and 100 and that or those with an $SiO_2/Al_2O_3$ mole ratio of between 2 and 30

(upper limit excluded), can be obtained by any method known to those skilled in the art, for instance by direct synthesis in the case of FAU zeolites having an $SiO_2/Al_2O_3$ mole ratio of less than 6, or by steam treatment (steaming) and/or acid washes on a zeolite of FAU structure type having an $SiO_2/Al_2O_3$ mole ratio of less than 6 in the case of FAU zeolites having an $SiO_2/Al_2O_3$ mole ratio of greater than or equal to 6. Said starting zeolites of FAU structure type may be used in their sodium form or any other form. They may, for example, before being used in the process according to the invention, undergo an exchange of part or all of their sodium cations with ammonium cations, optionally followed by a calcining step. Among the sources of FAU zeolites with an $SiO_2/Al_2O_3$ mole ratio of between 30 and 100 and the sources of FAU zeolites with an $SiO_2/Al_2O_3$ mole ratio of between 2 and 30 (upper limit excluded) mention may be made of the commercial zeolites of Y type produced by Zeolyst and by Tosoh, for example the commercial zeolites CBV100, CBV600, CBV712, CBV720, CBV760 and CBV780, and the commercial zeolites HSZ-320HOA, HSZ-350HUA, HSZ-360HUA and HSZ-385HUA.

In accordance with the invention, the mixing step i) is performed in an aqueous medium, that is to say in water, preferably deionized water, such that the $H_2O/(SiO_{2\,(FAU)})$ mole ratio is advantageously between 1 and 100, preferably between 5 and 60, $SiO_{2\,(FAU)}$ being the molar amount of $SiO_2$ provided by the starting FAU zeolite, $H_2O$ being the molar amount of water present in the reaction mixture.

In accordance with the invention, the reaction mixture comprises at least one, preferably one, organonitrogen compound R chosen from 1,5-bis(methylpiperidinium)pentane dihydroxide, 1,6-bis(methylpiperidinium)hexane dihydroxide, 1,7-bis(methylpiperidinium)heptane dihydroxide and mixtures thereof, said compound being incorporated into the reaction mixture for the implementation of step (i), as an organic structuring agent. Preferably, the structuring agent R incorporated into the reaction mixture is 1,6-bis(methylpiperidinium)hexane dihydroxide. The anion associated with the quaternary ammonium cations present in the organic structuring species for the synthesis of an AFX-BEA zeolite composite material according to the invention is the hydroxide anion.

Advantageously, the structuring agent R is incorporated into the reaction mixture such that the $(R/(SiO_{2\,(FAU)}))$ mole ratio between the molar amount of said organonitrogen compound R and the molar amount of $SiO_2$ provided by all the starting zeolites is between 0.01 and 0.6, preferably between 0.05 and 0.5.

According to the invention, at least one source of at least one alkali and/or alkaline-earth metal M of valency n, n being an integer greater than or equal to 1, is used in the reaction mixture of step i). The alkali metal and/or alkaline-earth metal M is preferably chosen from lithium, potassium, sodium, magnesium and calcium and a mixture of at least two of these metals. Very preferably, M is sodium.

The source of at least one alkali and/or alkaline-earth metal M is preferably sodium hydroxide.

Advantageously, the amount of alkali metal and/or alkaline-earth metal M of valency n incorporated into the reaction mixture is such that the $M_{2/n}O/(SiO_{2(FAU)})$ mole ratio is between 0.005 and 0.45, preferably between 0.01 and 0.25, $M_{2/n}O$ being the molar amount of $M_{2/n}O$ provided by all the FAU zeolites and by the source of alkali metal and/or alkaline-earth metal, and $SiO_{2\,(FAU)}$ the molar amount of $SiO_2$ provided by all the FAU zeolites incorporated into the reaction mixture.

The mixing step i) of the process according to the invention is performed until a homogeneous reaction mixture is obtained, called a gel or precursor gel, preferably for a period greater than or equal to 10 minutes and advantageously for less than 2 hours, in particular less than 1.5 hours, preferably at room temperature and preferably with stirring, at a low or high shear rate, the stirring system being any system known to those skilled in the art, for example a mechanical stirrer with blades or a turbomixer.

During this mixing step i), the aqueous solvent introduced may optionally partly evaporate.

Step (i) of the process according to the invention consists in preparing an aqueous reaction mixture containing at least two zeolites of FAU structure type, at least one organonitrogen compound R, R being 1,5-bis(methylpiperidinium)pentane dihydroxide, 1,6-bis(methylpiperidinium)hexane dihydroxide and/or 1,7-bis(methylpiperidinium)heptane dihydroxide in the presence of at least one source of one or more alkali metal(s) and/or alkaline-earth metal(s), to obtain a precursor gel of an AFX-BEA composite material. The amounts of said reagents are as indicated above so as to give this gel a composition allowing an AFX-BEA composite material to be crystallized.

It may be advantageous to add seeds of a zeolite of AFX structure type, of a zeolite of BEA structure type and/or of an AFX-BEA composite material to the reaction mixture during said step i) of the process of the invention in order to reduce the time required for the formation of crystals of the zeolite composite material and/or the total crystallization time. Said seed crystals also promote the formation of said AFX-BEA composite material to the detriment of impurities. The seed crystals are generally added in a proportion of between 0.01% and 10% of the total mass of the sources of said tetravalent and trivalent element(s) considered in their anhydrous form used in the reaction mixture, said seed crystals not being taken into account in the total mass of the sources of the tetravalent and trivalent elements. Said seeds are not taken into account either for determining the composition of the reaction mixture and/or of the gel, defined above, i.e. in the determination of the various mole ratios, in particular $(SiO_{2\,(FAU)})/(Al_2O_{3\,(FAU)})$, $H_2O/(SiO_{2\,(FAU)})$, $R/(SiO_{2\,(FAU)})$, $M_{2/n}O/(SiO_{2\,(FAU)})$, of the composition of the reaction mixture.

It may be advantageous to perform maturation of the reaction mixture during said step i) of the process of the invention, before the hydrothermal crystallization, so as to control the size of the crystals of an AFX-BEA zeolite composite material. Said maturation also promotes the formation of said AFX-BEA zeolite composite material to the detriment of impurities. The maturation of the reaction mixture during said step i) of the process of the invention may be performed at room temperature or at a temperature of between 20 and 100° C. with or without stirring, for a time advantageously of between 30 minutes and 48 hours.

Hydrothermal Treatment Step ii)

The preparation process according to the invention comprises a step ii) of hydrothermal treatment of said precursor gel obtained from step i), which has optionally been matured, at a temperature of between 120° C. and 220° C., for a time of between 12 hours and 15 days, until said AFX-BEA composite material forms, i.e. up to crystallization, preferably complete crystallization, of said composite material. According to the invention, this hydrothermal treatment step ii) can also be called a crystallization step, a reaction step or a synthetic step.

According to the invention, the crystallization is considered complete as soon as no more presence of amorphous product or FAU zeolite is detected by XRD analysis of a sample of the reaction medium extracted during the synthesis.

In accordance with step (ii) of the process according to the invention, the precursor gel obtained from step i), is subjected to a hydrothermal treatment, performed at a temperature of between 120° C. and 220° C., preferably between 150° C. and 195° C. The time required to obtain crystallization, preferably complete crystallization, ranges between 12 hours and 15 days, preferably between 12 hours and 12 days and more preferably between 12 hours and 8 days.

Advantageously, the hydrothermal treatment is performed under an autogenous reaction pressure, optionally by adding gas, for example nitrogen.

The reaction is generally performed with or without stirring, preferably with stirring. Any stirring system known to those skilled in the art may be used, for example, inclined blades with counter-blades, stirring turbomixers or Archimedean screws.

At the end of the reaction, the solid phase formed is preferably filtered, washed and then dried. The drying is generally performed at a temperature of between 20° C. and 150° C., preferably between 60° C. and 100° C., for a time of between 5 and 24 hours.

The loss on ignition of said AFX-BEA composite material obtained after drying and before the optional calcining step is generally between 5% and 15% by weight.

According to the invention, loss on ignition (LOI) refers to the percentage loss of mass experienced by a solid compound, a mixture of solid compounds or a paste, in particular by the composite material prepared according to the invention, during a heat treatment at 1000° C. for 2 hours, in a static oven (of muffle furnace type), relative to the mass of the solid compound, of the mixture of solid compounds or of the paste in its initial form, in particular relative to the mass of the dried composite material tested. The loss on ignition corresponds in general to the loss of solvent (such as water) present in the solids, but also to the removal of organic compounds contained in the mineral solid constituents.

Advantageously, the solid obtained from step ii) of the process according to the invention, which is preferably washed and dried, may then be calcined. The step of calcining said AFX-BEA composite material obtained according to the process of the invention is preferentially performed at a temperature of between 450 and 700° C. for a time of between 2 and 20 hours. The calcination may be preceded by a gradual temperature increase.

The solid obtained from the calcining step, advantageously composed of the AFX-BEA composite material, is free of any organic species and in particular of the organic structuring agent R.

The AFX-BEA composite material, obtained at the end of step ii) of the process according to the invention, which is preferably washed and dried and optionally calcined, is generally analysed by X-ray diffraction. X-ray diffraction makes it possible to confirm that the solid obtained is indeed the expected zeolite composite material. This technique also makes it possible to determine the mass proportion of the mixture of AFX and BEA zeolites in said composite material according to the invention or obtained via the process of the invention. Advantageously, the mass proportion of the AFX and BEA zeolites of the composite material obtained is greater than or equal to 90%, preferably greater than or equal to 95%, preferentially greater than or equal to 98% and even more preferably greater than or equal to 99.8%. In other words, the zeolite composite material obtained comprises less than 10% by mass, preferably less than 5% by mass, preferentially less than 1% by mass and even more preferably less than 0.2% by mass of impurities and/or of crystalline or amorphous phase other than AFX and BEA (the limits not being included). Very advantageously, the process of the invention leads to the formation of an AFX-BEA composite material, free of any other crystalline or amorphous phase.

This technique also makes it possible to determine the relative proportions of each AFX and BEA zeolite contained in said composite material according to the invention or obtained via the process of the invention.

Advantageously, the solid obtained via the process according to the invention has the X-ray diffraction diagram which includes at least the lines recorded in Table 1.

This diffraction diagram is obtained by radiocrystallographic analysis by means of a diffractometer using the conventional powder method with the $K\alpha_1$ radiation of copper ($\lambda=1.5406$ Å). On the basis of the position of the diffraction peaks represented by the angle $2\theta$, the lattice constant distances $d_{hkl}$ characteristic of the sample are calculated using the Bragg relationship. The measurement error $\Delta(d_{hkl})$ on $d_{hkl}$ is calculated by means of the Bragg relationship as a function of the absolute error $\Delta(2\theta)$ assigned to the measurement of $2\theta$. An absolute error $\Delta(2\theta)$ equal to $\pm 0.02°$ is commonly accepted. The relative intensity $I_{rel}$ assigned to each value of $d_{hkl}$ is measured according to the height of the corresponding diffraction peak. The X-ray diffraction diagram of the crystalline solid obtained from step ii) of the process according to the invention includes at least the lines at the values of $d_{hkl}$ given in Table 1. In the column of the $d_{hkl}$ values, the mean values of the inter-lattice distances are given in Angstroms (Å). Each of these values must be assigned the measurement error $\Delta(d_{hkl})$ of between $\pm 0.6$ Å and $\pm 0.01$ Å.

TABLE 1

Mean values of $d_{hkl}$ and relative intensities measured on an X-ray diffraction diagram of the zeolite composite material according to the invention

| 2 theta (°) | dhkl (Å) | Irel |
|---|---|---|
| 7.49 | 11.79 | vw-w |
| 7.71 | 11.46 | vw-w |
| 8.71 | 10.14 | mw-m |
| 11.66 | 7.59 | w-mw |
| 12.97 | 6.82 | w |
| 15.00 | 5.90 | vw |
| 15.40 | 5.75 | vw |
| 15.66 | 5.66 | w-mw |
| 17.47 | 5.07 | mw |
| 17.90 | 4.95 | w-mw |
| 19.42 | 4.57 | vw |
| 19.88 | 4.46 | vw-w |
| 20.38 | 4.36 | S-VS |
| 21.08 | 4.21 | w |
| 21.31 | 4.17 | vw-w |
| 21.82 | 4.07 | S-VS |
| 22.19 | 4.00 | w-m |
| 22.34 | 3.98 | w-VS |
| 22.54 | 3.94 | vw-w |
| 22.70 | 3.91 | vw-w |
| 23.67 | 3.76 | mw |
| 25.24 | 3.52 | vw |
| 26.11 | 3.41 | w-m |
| 26.94 | 3.31 | vw |
| 27.11 | 3.29 | vw |
| 27.61 | 3.23 | vw |
| 28.04 | 3.18 | mw-m |
| 28.68 | 3.11 | vw |
| 29.51 | 3.03 | vw |

TABLE 1-continued

Mean values of $d_{hkl}$ and relative intensities measured on an X-ray diffraction diagram of the zeolite composite material according to the invention

| 2 theta (°) | dhkl (Å) | Irel |
|---|---|---|
| 30.19 | 2.96 | vw-w |
| 30.58 | 2.92 | mw |
| 30.99 | 2.88 | vw |
| 31.59 | 2.83 | w-mw |
| 32.50 | 2.75 | vw |
| 33.73 | 2.66 | w-mw |
| 34.29 | 2.61 | vw |
| 34.78 | 2.58 | vw |
| 35.11 | 2.55 | vw |
| 35.79 | 2.51 | vw |
| 37.56 | 2.39 | vw |
| 38.00 | 2.37 | vw |
| 39.18 | 2.30 | vw |
| 39.61 | 2.30 | vw | where VS = very strong; S = strong; m = medium; mw = moderately weak; w = weak; vw = very weak. The relative intensity $I_{rel}$ is given in relation to a relative intensity scale in which a value of 100 is assigned to the most intense line of the X-ray diffraction diagram: vw < 15; 15 ≤ w < 30; 30 ≤ mw < 50; 50 ≤ m < 65; 65 ≤ S < 85; VS ≥ 85; 1 ≤ vw-w < 30; 30 ≤ mw-m < 65; 15 ≤ w-mw < 50; 65 ≤ S-VS ≤ 100; 15 ≤ w-m < 65; 15 ≤ w-VS ≤ 100.

According to the invention, the mass composition of the composite material prepared, in particular the relative mass fractions of the zeolites of AFX structure type and of BEA structure type present in said composite material, is advantageously determined to using a method similar to standard ASTM D3906 03, by comparison of the areas of the peaks at the angles (2θ) 20.38±0.1 (hkl: 211); 23.67±0.1 (hkl: 105); 26.1±0.1 (hkl: 303) and 28.02±0.1 (hkl: 106) of the X-ray diagrams obtained for the composite material according to the invention and a reference zeolite of AFX structure type, preferably of high purity. The mass ratio of the two zeolites AFX and BEA in the composite material according to the invention is thus evaluated by comparing the sum of the areas of the peaks at the angles (2θ) mentioned above obtained for the composite material prepared according to the invention, with that obtained for a zeolite reference sample and by using the following calculation formula:

$$AFX/BEA = S_{AFXc}/(S_{AFXr} - S_{AFXc})$$

in which $S_{AFXc}$ is the sum of the areas of the peaks present at the angles (2θ) 20.38±0.1 (hkl: 211); 23.67±0.1 (hkl: 105); 26.1±0.1 (hkl: 303) and 28.02±0.1 (hkl: 106) of the diffractogram of the AFX-BEA composite material prepared according to the invention, and $S_{AFXr}$ is the sum of the areas of the peaks present at the angles (2θ): 20.38 (hkl: 211); 23.67 (hkl: 105); 26.1 (hkl: 303) and 28.02 (hkl: 106) of the diffractogram of the pure AFX-structure zeolite, used as a reference. The pure zeolite of AFX structure type used as reference may be prepared, for example, according to the process illustrated in example 7 of the present specification.

X-ray fluorescence spectrometry (XFS) may advantageously be used to determine the presence and quantification of elements in the composite material. X-ray fluorescence spectrometry (XFS) is a chemical analysis technique using a physical property of matter, X-ray fluorescence. It enables the analysis of the majority of the chemical elements starting from beryllium (Be) in concentration ranges ranging from a few ppm to 100%, with precise and reproducible results. X-rays are used to excite the atoms in a sample, which makes them emit X-rays having an energy characteristic of each element present. The intensity and the energy of these X-rays are then measured to determine the concentration of the elements, for example Si and Al, in the composite material.

It is also advantageous to obtain the protonated form of the AFX-BEA zeolite composite material obtained via the process according to the invention. Said hydrogen form may be obtained by performing an ion exchange with an acid, in particular a strong mineral acid such as hydrochloric, sulfuric or nitric acid, or with a compound such as ammonium chloride, sulfate or nitrate. The ion exchange may be performed by placing said AFX-BEA zeolite composite material in suspension one or more times with the ion-exchange solution. Said AFX-BEA zeolite composite material may be calcined before or after the ion exchange or between two ion-exchange steps. The AFX-BEA zeolite composite material is preferably calcined before the ion exchange, so as to remove any organic substance included in the porosity of the AFX-BEA zeolite composite material, since the ion exchange is thereby facilitated.

Said AFX-BEA composite material obtained, preferably after the drying step and after the optional calcining step, is ready for subsequent steps, for example ion-exchange. For these steps, any conventional method known to those skilled in the art may be employed.

The IAFX-BEA zeolite composite material obtained via the process of the invention may be used after ion exchange as acidic solid for catalysis in the fields of refining and petrochemistry. It may also be used as an adsorbent or as a molecular sieve.

The invention is illustrated by the examples that follow, which are not in any way limiting in nature.

EXAMPLES

The invention is illustrated by the examples that follow, which are not in any way limiting in nature.

Example 1: Preparation of 1,6-bis(methylpiperidinium)hexane dihydroxide (Structuring Agent R)

50 g of 1,6-dibromohexane (0.20 mol, 99%, Alfa Aesar) are placed in a 1 L round-bottomed flask containing 50 g of N-methylpiperidine (0.51 mol, 99%, Alfa Aesar) and 200 ml of ethanol. The reaction medium is stirred at reflux for 5 hours. The mixture is then cooled to ambient temperature and then filtered. The mixture is poured into 300 ml of cold diethyl ether and the precipitate formed is then filtered off and washed with 100 ml of diethyl ether. The solid obtained is recrystallized in an ethanol/ether mixture. The solid obtained is dried under vacuum for 12 hours. 71 g of a white solid are obtained (i.e. a yield of 80%).

The product has the expected $^1$H NMR spectrum. $^1$H NMR (D$_2$O, ppm/TMS): 1.27 (4H, m); 1.48 (4H, m); 1.61 (4H, m); 1.70 (8H, m); 2.85 (6H, 5); 3.16 (12H, m). This $^1$H NMR spectrum corresponds to that of 1,6-bis(methylpiperidinium)hexane dibromide.

18.9 g of Ag$_2$O (0.08 mol, 99%, Aldrich) are placed in a 250 ml Teflon beaker containing 30 g of 1,6-bis(methylpiperidinium)hexane dibromide (0.07 mol) prepared and 100 ml of deionized water. The reaction medium is stirred for 12 hours in the absence of light. The mixture is then filtered. The filtrate obtained is composed of an aqueous solution of 1,6-bis(methylpiperidinium)hexane dihydroxide. Assaying of this species is performed by proton NMR using formic acid as standard.

Example 2: Preparation of an AFX-BEA Composite Material According to the Invention 0.013 g of a zeolite of FAU structure type (CBV600 Zeolyst, SiO$_2$/Al$_2$O$_3$=5.46, PAF=12.65) was mixed with 4.887 g of deionized water. 0.773 g of a zeolite of FAU structure type (CBV720 Zeolyst, SiO$_2$/Al$_2$O$_3$=33.52, PAF=6.63, P$_{ze}$=3321) is added to the previous mixture, and the preparation obtained is kept stirring for 10 minutes. 2.900 g of an aqueous solution of 1,6-bis(methylpiperidinium)hexane dihydroxide (20.91% by weight) prepared according to example 1 are added to the above mixture. The mixture is then kept stirring for 10 minutes. 0.429 g of a 20% by weight aqueous solution of sodium hydroxide (solution prepared from sodium hydroxide at 98% by weight, Aldrich) is added to the mixture and kept stirring for 10 minutes. The molar composition of the precursor gel is as follows: 60 SiO$_2$: 1.9 Al$_2$O$_3$: 10 R(OH)$_2$: 5.6 Na$_2$O: 2204 H$_2$O, i.e. an SiO$_2$/Al$_2$O$_3$ ratio of 31.6.

The precursor gel is then transferred, after homogenization, into an autoclave. The autoclave is closed and then heated for 2 days at 180° C. with stirring at 35 rpm with a rotary spit system. The crystalline product obtained is filtered off, washed with deionized water and then dried overnight at 100° C. The loss on ignition (LOI) of the dried solid, evaluated after drying at 1000° C. for 2 hours, is 9.5%.

The solid is then introduced into a muffle furnace where a step of calcining in air is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analyzed by X-ray diffraction and identified as being constituted of a mixture of approximately 30% by mass of a zeolite of AFX structure type and 70% by mass of a zeolite of BEA structure type. The AFX-BEA mixture represents approximately 100% by mass of the product obtained.

Example 3: Preparation of an AFX-BEA Composite Material According to the Invention 0.013 g of a zeolite of FAU structure type (CBV600 Zeolyst, SiO$_2$/Al$_2$O$_3$=5.46, PAF=12.65) was mixed with 4.887 g of deionized water. 0.773 g of a zeolite of FAU structure type (CBV720 Zeolyst, SiO$_2$/Al$_2$O$_3$=33.52, PAF=6.63, P$_{ze}$=3321) is added to the previous mixture, and the preparation obtained is kept stirring for 10 minutes. 2.900 g of an aqueous solution of 1,6-bis(methylpiperidinium)hexane dihydroxide (20.91% by weight) prepared according to example 1 are added to the above mixture. The mixture is then kept stirring for 10 minutes. 0.429 g of a 20% by weight aqueous solution of sodium hydroxide (solution prepared from sodium hydroxide at 98% by weight, Aldrich) is added to the mixture and kept stirring for a further 30 minutes. The molar composition of the precursor gel is as follows: 60 SiO$_2$: 1.9 Al$_2$O$_3$: 10 R(OH)$_2$: 5.6 Na$_2$O: 2204 H$_2$O i.e. an SiO$_2$/Al$_2$O$_3$ ratio of 31.6.

The precursor gel is then transferred, after homogenization, into an autoclave. The autoclave is closed and then heated for 6 days at 170° C. with stirring at 35 rpm with a rotary spit system. The crystalline product obtained is filtered off, washed with deionized water and then dried overnight at 100° C. The loss on ignition (LOI) of the dried solid, evaluated after drying at 1000° C. for 2 hours, is 9.8%.

The solid is then introduced into a muffle furnace where a step of calcining under a stream of air is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

Figure 1:
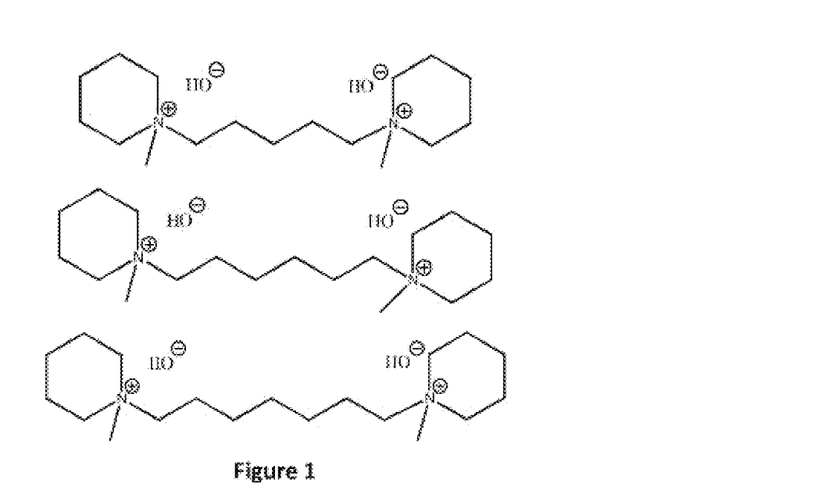
FIG. 1 represents the chemical formulae of the specific organonitrogen compounds which may be chosen as structuring agent in the synthetic process according to the invention.
Figure 2:
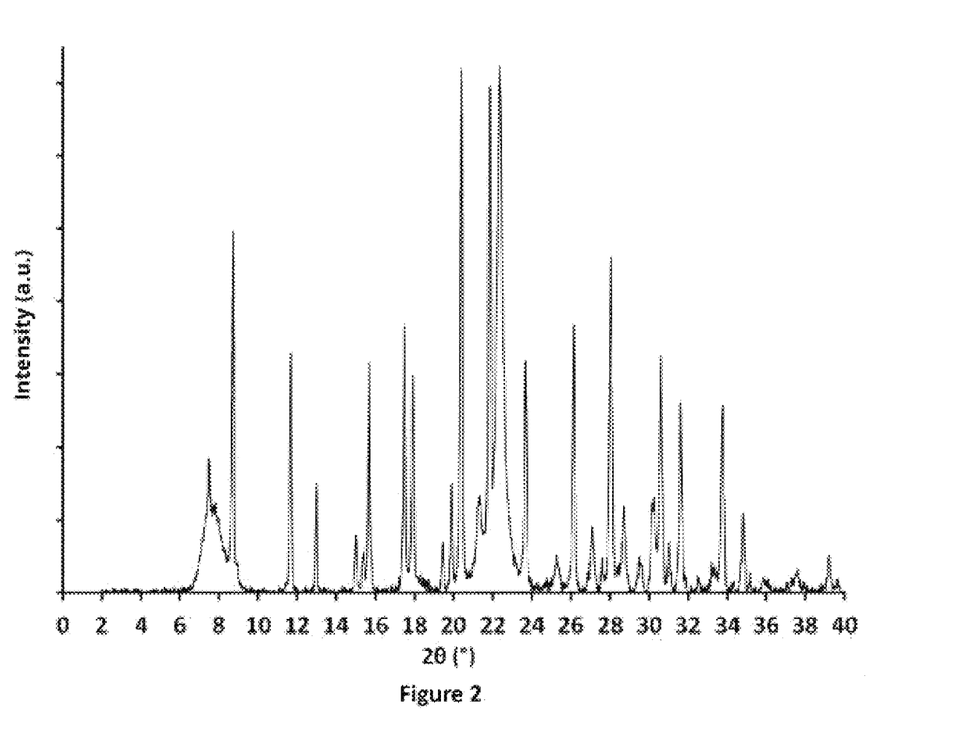
FIG. 2 represents the X-ray diffraction diagram of the composite material according to the invention, composed of a zeolite of AFX structure type and of a zeolite of BEA structure type, obtained according to example 3.

The calcined solid product was analyzed by X-ray diffraction and identified as being constituted of a mixture of approximately 50% by mass of a zeolite of AFX structure type and 50% by mass of a zeolite of BEA structure type. The AFX-BEA mixture represents approximately 100% by mass of the product obtained. The X-ray diffraction diagram produced for the calcined solid is given in FIG. 2. The SiO$_2$/Al$_2$O$_3$ mole ratio of this material determined by XFS is 20.04.

Figure 3:
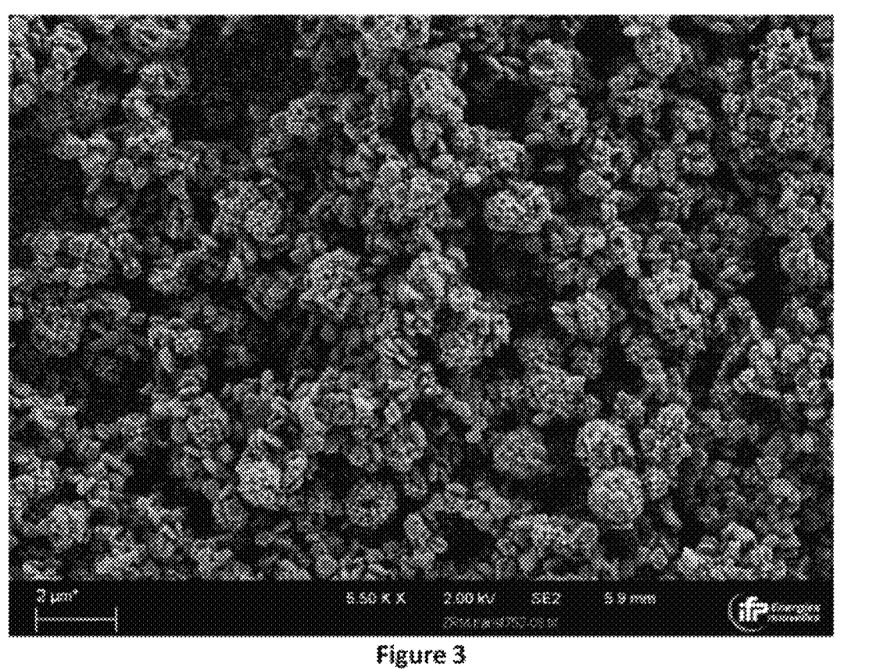
FIG. 3 represents a scanning electron microscope (SEM) image of the composite material according to the invention, composed of a mixture of a zeolite of AFX structure type and of a zeolite of BEA structure type, obtained according to example 3.

The composite material obtained is analyzed by scanning electron microscopy (SEM). FIG. 3 shows the SEM image of the composite material obtained.

Example 4: Preparation of an AFX-BEA Composite Material According to the Invention 0.239 g of a zeolite of FAU structure type (CBV712 Zeolyst, SiO$_2$/Al$_2$O$_3$=11.42, PAF=12.81) was mixed with 4.952 g of deionized water. 0.573 g of a zeolite of FAU structure type (CBV780 Zeolyst, SiO$_2$/Al$_2$O$_3$=98.22, PAF=8.52, P$_{ze}$=7170) is added to the previous mixture, and the preparation obtained is kept stirring for 10 minutes. 2.905 g of an aqueous solution of 1,6-bis(methylpiperidinium)hexane dihydroxide (20.91% by weight) prepared according to example 1 are added to the above mixture. The mixture is then kept stirring for 10 minutes. 0.330 g of a 20% by weight aqueous solution of sodium hydroxide (solution prepared from sodium hydroxide at 98% by weight, Aldrich) is added to the mixture and kept stirring for 10 minutes. The molar composition of the precursor gel is as follows: 60 SiO$_2$: 1.8 Al$_2$O$_3$: 10 R(OH)$_2$: 4.3 Na$_2$O: 2204 H$_2$O, i.e. an SiO$_2$/Al$_2$O$_3$ ratio of 33.3.

The precursor gel is then transferred, after homogenization, into an autoclave. The autoclave is closed and then heated for 6 days at 180° C. with stirring at 35 rpm with a rotary spit system. The crystalline product obtained is filtered off, washed with deionized water and then dried overnight at 100° C. The loss on ignition (LOI) of the dried solid, evaluated after drying at 1000° C. for 2 hours, is 10.1%.

The solid is then introduced into a muffle furnace where a step of calcining under a stream of air is performed: the calcination cycle comprises an increase in temperature of 1.5° C./minute up to 200° C., a steady stage at 200° C.

maintained for 2 hours, an increase in temperature of 1° C./minute up to 550° C., followed by a steady stage at 550° C. maintained for 8 hours, then return to room temperature.

The calcined solid product was analyzed by X-ray diffraction and identified as being constituted of a mixture of approximately 50% by mass of a zeolite of AFX structure type and 50% by mass of a zeolite of BEA structure type. The AFX-BEA mixture represents approximately 100% by mass of the product obtained.

Example 5: Preparation of an AFX-BEA Composite Material According to the Invention 0.030 g of a zeolite of FAU structure type (CBV712 Zeolyst, $SiO_2/Al_2O_3$=11.42, PAF=12.81) was mixed with 5.231 g of deionized water. 0.758 g of a zeolite of FAU structure type (CBV720 Zeolyst, $SiO_2/Al_2O_3$=33.52, PAF=6.63, $P_{ze}$=3261) is added to the previous mixture, and the preparation obtained is kept stirring for 10 minutes. 2.900 g of an aqueous solution of 1,6-bis(methylpiperidinium)hexane dihydroxide (20.91% by weight) prepared according to example 1 are added to the above mixture. The mixture is then kept stirring for 10 minutes. 0.086 g of sodium hydroxide (purity of 98% by weight, Aldrich) is subsequently incorporated into the mixture, which is kept stirring for a further 30 minutes. The molar composition of the precursor gel is as follows: 60 $SiO_2$: 1.9 $Al_2O_3$: 10 $R(OH)_2$: 5.6 $Na_2O$: 2204 $H_2O$, i.e. an $SiO_2/Al_2O_3$ ratio of 31.6.

The precursor gel is then transferred, after homogenization, into an autoclave. The autoclave is closed and then heated for 3 days at 170° C. with stirring at 35 rpm with a rotary spit system. The crystalline product obtained is filtered off, washed with deionized water and then dried overnight at 100° C. The loss on ignition (LOI) of the dried solid, evaluated after drying at 1000° C. for 2 hours, is 9.8%.

The solid is then introduced into a muffle furnace where a step of calcining under a stream of air is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analyzed by X-ray diffraction and identified as being constituted of a mixture of approximately 30% by mass of a zeolite of AFX structure type and 70% by mass of a zeolite of BEA structure type. The AFX-BEA mixture represents approximately 100% by mass of the product obtained.

Example 6: Preparation of an AFX-BEA Composite Material According to the Invention 0.030 g of a zeolite of FAU structure type (CBV712 Zeolyst, $SiO_2/Al_2O_3$=11.42, PAF=12.81) was mixed with 5.231 g of deionized water. 0.758 g of a zeolite of FAU structure type (CBV720 Zeolyst, $SiO_2/Al_2O_3$=33.52, PAF=6.63, $P_{ze}$=3261) is added to the previous mixture, and the preparation obtained is kept stirring for 10 minutes. 2.900 g of an aqueous solution of 1,6-bis(methylpiperidinium)hexane dihydroxide (20.91% by weight) prepared according to example 1 are added to the above mixture. The mixture is then kept stirring for 10 minutes. 0.086 g of sodium hydroxide (purity of 98% by weight, Aldrich) is subsequently incorporated into the mixture, which is kept stirring for a further 30 minutes. The molar composition of the precursor gel is as follows: 60 $SiO_2$: 1.9 $Al_2O_3$: 10 $R(OH)_2$: 5.6 $Na_2O$: 2204 $H_2O$, i.e. an $SiO_2/Al_2O_3$ ratio of 31.6.

The precursor gel is then transferred, after homogenization, into an autoclave. The autoclave is closed and then heated for 2 days at 180° C. with stirring at 35 rpm with a rotary spit system. The crystalline product obtained is filtered off, washed with deionized water and then dried overnight at 100° C. The loss on ignition (LOI) of the dried solid, evaluated after drying at 1000° C. for 2 hours, is 10.1%.

The solid is then introduced into a muffle furnace where a step of calcining under a stream of air is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analyzed by X-ray diffraction and identified as being constituted of a mixture of approximately 35% by mass of a zeolite of AFX structure type and 65% by mass of a zeolite of BEA structure type. The AFX-BEA mixture represents 99% by mass of the product obtained.

Example 7: Preparation of a Pure Zeolite of AFX Structure Type 0.179 g of a zeolite of FAU structure type (CBV600 Zeolyst, $SiO_2/Al_2O_3$=5.46, PAF=12.65%) was mixed with 4.86 g of deionized water. 0.643 g of a zeolite of FAU structure type (CBV720 Zeolyst, $SiO_2/Al_2O_3$=33.52, PAF=6.63%) is added to the previous mixture, and the preparation obtained is kept stirring for 10 minutes. 2.891 g of an aqueous solution of 1,6-bis(methylpiperidinium) hexane dihydroxide (20.91% by weight) prepared according to example 1 are added to the above mixture, and the preparation is kept stirring for 10 minutes, 0.428 g of an aqueous solution containing 20% by weight of sodium hydroxide with a purity of 98% by weight (Aldrich) is subsequently incorporated into the synthetic mixture, which is kept stirring for 30 minutes. The molar composition of the mixture is as follows: 60 $SiO_2$: 3.3 $Al_2O_3$: 10 R: 5.6 $Na_2O$: 2204 $H_2O$, i.e. an $SiO_2/Al_2O_3$ ratio of 18. The precursor gel is then transferred, after homogenization, into an autoclave. The autoclave is closed and then heated for 6 days at 180° C. with stirring at 35 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

Figure 4:
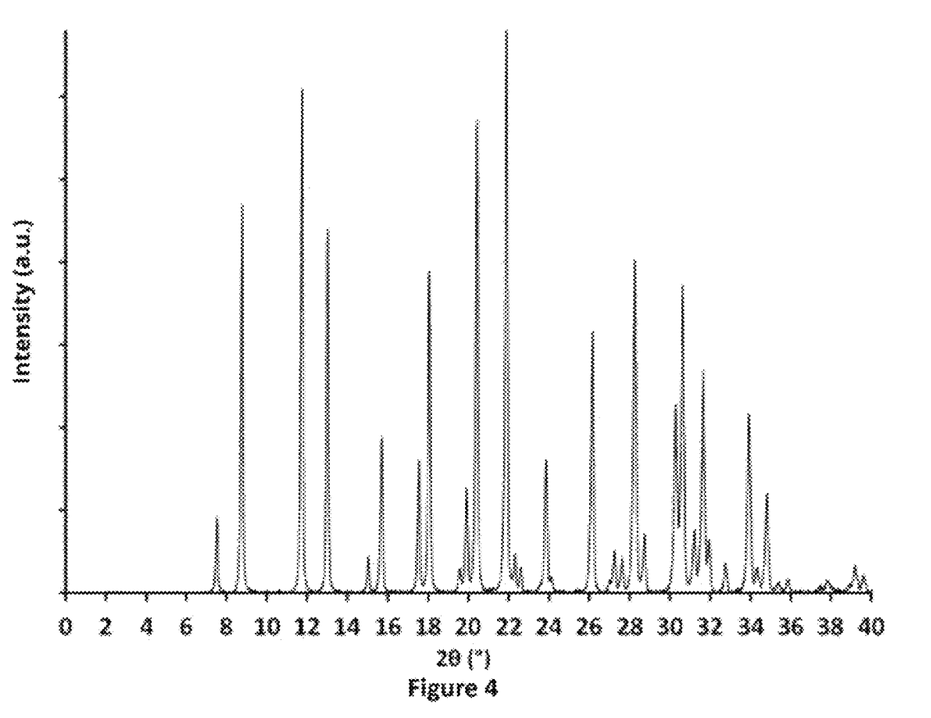
FIG. 4 represents the X-ray diffraction diagram of the pure zeolite of AFX structure type obtained according to example 7.

The calcined solid product was analyzed by X-ray diffraction and identified as consisting of a pure zeolite of AFX structure type, i.e. with a purity of greater than 99.8% by weight. The diffraction diagram produced for the calcined solid of AFX structure type is given in FIG. 4. The product has an $SiO_2/Al_2O_3$ mole ratio of 12.7 as determined by X-ray fluorescence.

The invention claimed is:

1. A process for preparing a zeolite composite material composed of a mixture of zeolites of AFX structure type and of BEA structure type, comprising at least the following steps:
   i) mixing, in aqueous medium, of an FAU zeolite having an $SiO_2/Al_2O_3$ mole ratio of between 30 and 100 with at least one zeolite of FAU structure type having an $SiO_2/Al_2O_3$ mole ratio of at least 2 and less than 30, and in which the mathematical parameter, $P_{ze}$, corresponding to the mass percentage of the FAU zeolite with an $SiO_2/Al_2O_3$ mole ratio of between 30 and 100, in its anhydrous form in the mixture of FAU zeolites, multiplied by the $SiO_2/Al_2O_3$ mole ratio of said same FAU zeolite with an $SiO_2/Al_2O_3$ mole ratio of between 30 and 100, is such that: $3250<P_{ze}<7200$, of at least one organonitrogen compound R, chosen from 1,5-bis(methylpiperidinium)pentane dihydroxide, 1,6-bis(methylpiperidinium)hexane dihydroxide, 1,7-bis(methylpiperidinium)heptane dihydroxide and mixtures thereof, and of at least one source of at least one alkali metal and/or alkaline-earth metal M of valency n, n being an integer greater than or equal to 1, the reaction mixture having the following molar composition:
   $(SiO_{2(FAU)})/(Al_2O_{3(FAU)})$ of between 30 and 80,
   $H_2O/(SiO_{2(FAU)})$ of between 1 and 100,
   $R/(SiO_{2(FAU)})$ of between 0.01 and 0.6,
   $M_{2/n}O/(SiO_{2(FAU)})$ of between 0.005 and 0.45,
   in which $SiO_{2(FAU)}$ is the molar amount of $SiO_2$ provided by all the zeolites of FAU structure type introduced into the mixture, $Al_2O_{3(FAU)}$ is the molar amount of $Al_2O_3$ introduced by all the zeolites of FAU structure type introduced into the mixture, $H_2O$ the molar amount of water present in the reaction mixture, R the molar amount of said organonitrogen compound, $M_{2/n}O$ being the molar amount of $M_{2/n}O$ provided by all the FAU zeolites and by the source of alkali metal and/or alkaline-earth metal, up to the production of a homogeneous precursor gel; ii) hydrothermal treatment of said precursor gel obtained from of step i) at a temperature of between 120° C. and 220° C., for a time of between 12 hours and 15 days.

2. The process as claimed in claim 1, in which R is 1,6-bis(methylpiperidinium)hexane dihydroxide.

3. The process as claimed in claim 1, in which the mathematical parameter $P_{ze}$ is such that: $3350<P_{ze}<7100$.

4. The process as claimed in claim 1, in which the $(SiO_{2(FAU)})/(Al_2O_{3(FAU)})$ mole ratio is between 32 and 70.

5. The process as claimed in claim 1, in which the $R/(SiO_{2(FAU)})$ mole ratio is between 0.05 and 0.5.

6. The process as claimed in claim 1, in which the $H_2O/(SiO_{2(FAU)})$ mole ratio is between 5 and 60.

7. The process as claimed in claim 1, in which the $M_{2/n}O/(SiO_{2(FAU)})$ mole ratio is between 0.01 and 0.25.

8. The process as claimed in claim 1, in which M is chosen from lithium, potassium, sodium, magnesium and calcium and a mixture of at least two of these metals.

9. The process as claimed in claim 8, in which the source of at least one alkali and/or alkaline-earth metal M is sodium hydroxide.

10. The process as claimed in claim 1, in which step i) is performed for a time of greater than or equal to 10 minutes.

11. The process as claimed in claim 1, in which crystal seeds of a zeolite of AFX structure type, of a zeolite of BEA structure type and/or of an AFX-BEA composite material are added to the reaction mixture of step i).

12. The process as claimed in claim 1, in which step i) comprises a step of maturing the reaction mixture at a temperature of between 20 and 100° C., with or without stirring, for a time of between 30 minutes and 48 hours.

13. The process as claimed in claim 1, in which the hydrothermal treatment of step ii) is performed at a temperature of between 120° C. and 220° C. for a period of between 12 hours and 15 days.

14. The process as claimed in claim 1, in which the solid phase obtained from step ii) is filtered off, washed, and dried at a temperature of between 20 and 150° C. for a time of between 5 and 24 hours, to obtain a dried zeolite.

15. The process as claimed in claim 14, in which the dried zeolite is then calcined at a temperature of between 450 and 700° C. for a time of between 2 and 20 hours, the calcination possibly being preceded by a gradual temperature increase.

16. A zeolite composite material composed of a mixture of zeolites of AFX structure type and of BEA structure type, said composite material comprising:
   between 30% and 90% by mass of zeolite of AFX structure type, relative to the total mass of said composite material in its anhydrous form;
   between 10% and 70% by mass of BEA structure relative to the total mass of said composite material in its anhydrous form.

17. The composite material as claimed in claim 16, in which the zeolite of BEA structure type is a beta zeolite containing a mixture containing between 35 and 45% by mass of polymorph A and between 55 and 65% by mass of polymorph B.

18. A zeolite composite material composed of a mixture of zeolites of AFX structure type and of BEA structure type, said composite material comprising
   between 30% and 90% by mass of zeolite of AFX structure type, relative to the total mass of said composite material in its anhydrous form;
   between 10% and 70% by mass of BEA structure type relative to the total mass of said composite material in its anhydrous form,
   wherein the zeolite composite material is obtained via the process as claimed in claim 1.

19. The composite material as claimed in claim 16, having an $SiO_2/Al_2O_3$ mole ratio of between 2 and 100.

20. The composite material as claimed in claim 16, having an X-ray diffraction diagram comprising at least the lines having the mean values of $d_{hkl}$ and the relative intensities as follows:

| 2 theta (°) | dhkl (Å) | Irel |
|---|---|---|
| 7.49 | 11.79 | vw-w |
| 7.71 | 11.46 | vw-w |
| 8.71 | 10.14 | mw-m |
| 11.66 | 7.59 | w-mw |
| 12.97 | 6.82 | w |
| 15.00 | 5.90 | vw |
| 15.40 | 5.75 | vw |
| 15.66 | 5.66 | w-mw |
| 17.47 | 5.07 | mw |
| 17.90 | 4.95 | w-mw |
| 19.42 | 4.57 | vw |
| 19.88 | 4.46 | vw-w |
| 20.38 | 4.36 | S-VS |
| 21.08 | 4.21 | w |
| 21.31 | 4.17 | vw-w |
| 21.82 | 4.07 | S-VS |
| 22.19 | 4.00 | w-m |
| 22.34 | 3.98 | w-VS |
| 22.54 | 3.94 | vw-w |

-continued

| 2 theta (°) | dhkl (Å) | Irel |
|---|---|---|
| 22.70 | 3.91 | vw-w |
| 23.67 | 3.76 | mw |
| 25.24 | 3.52 | vw |
| 26.11 | 3.41 | w-m |
| 26.94 | 3.31 | vw |
| 27.11 | 3.29 | vw |
| 27.61 | 3.23 | vw |
| 28.04 | 3.18 | mw-m |
| 28.68 | 3.11 | vw |
| 29.51 | 3.03 | vw |
| 30.19 | 2.96 | vw-w |
| 30.58 | 2.92 | mw |
| 30.99 | 2.88 | vw |
| 31.59 | 2.83 | w-mw |
| 32.50 | 2.75 | vw |
| 33.73 | 2.66 | w-mw |
| 34.29 | 2.61 | vw |
| 34.78 | 2.58 | vw |
| 35.11 | 2.55 | vw |
| 35.79 | 2.51 | vw |
| 37.56 | 2.39 | vw |
| 38.00 | 2.37 | vw |
| 39.18 | 2.30 | vw |
| 39.61 | 2.30 | vw | where VS=very strong; S=strong; m=medium; mw=moderately weak; w=weak; vw=very weak, The relative intensity I $r_{rel}$ is given in relation to a relative intensity scale in which a value of 100 is assigned to the most intense line of the X-ray diffraction diagram: vw<15; 15≤w<30; 30≤mw<50; 50≤m<65; 65≤S<85; VS≥85; 1≤vw-w<30; 30≤mw-m<65; 15≤w-mw<50; 65≤S-VS≤100; 15≤w-m<65; 15≤w-VS≤100.

\* \* \* \* \*